United States Patent
Chen et al.

(10) Patent No.: US 8,311,669 B2
(45) Date of Patent: Nov. 13, 2012

(54) TANK-LOCKING DEVICE, SYSTEM FOR MANAGING LIQUID SUPPLY AND METHOD USING THE SAME

(75) Inventors: Yen-Liang Chen, Hsinchu County (TW); Yuh-Shyang Su, Hsinchu County (TW); Sou-Yung Hsieh, Taipei County (TW)

(73) Assignee: Powerchip Technology Corporation, Hsinchu (TW)

( * ) Notice: Subject to any disclaimer, the term of this patent is extended or adjusted under 35 U.S.C. 154(b) by 0 days.

(21) Appl. No.: 13/345,765

(22) Filed: Jan. 9, 2012

(65) Prior Publication Data
US 2012/0104088 A1   May 3, 2012

Related U.S. Application Data

(62) Division of application No. 12/022,983, filed on Jan. 30, 2008, now Pat. No. 8,140,184.

(30) Foreign Application Priority Data

Jun. 27, 2007 (TW) ............................... 96123208 A

(51) Int. Cl.
    *G06F 19/00* (2011.01)
(52) U.S. Cl. .............. 700/231; 141/1; 141/94; 700/242; 700/244; 700/265
(58) Field of Classification Search ................ 141/1, 94; 700/231, 242, 244, 265, 266
    See application file for complete search history.

(56) References Cited

U.S. PATENT DOCUMENTS

| | | | | |
|---|---|---|---|---|
| 4,688,026 | A * | 8/1987 | Scribner et al. | 235/385 |
| 6,347,723 | B1 * | 2/2002 | Barlian et al. | 141/94 |
| 6,649,829 | B2 * | 11/2003 | Garber et al. | 137/177 |
| 6,843,414 | B2 * | 1/2005 | Madrid et al. | 235/385 |
| 6,879,876 | B2 * | 4/2005 | O'Dougherty et al. | 700/231 |
| 7,259,675 | B2 * | 8/2007 | Baker et al. | 700/115 |
| 7,451,935 | B2 * | 11/2008 | Chang | 700/231 |
| 7,621,426 | B2 * | 11/2009 | Reynolds et al. | 222/325 |
| 7,664,568 | B2 * | 2/2010 | O'Dougherty et al. | 700/231 |
| 7,702,418 | B2 * | 4/2010 | O'Dougherty et al. | 700/231 |
| 7,747,344 | B2 * | 6/2010 | O'Dougherty et al. | 700/231 |
| 7,837,066 | B2 * | 11/2010 | Reynolds et al. | 222/52 |
| 2002/0038392 | A1 * | 3/2002 | De La Huerga | 710/8 |

* cited by examiner

*Primary Examiner* — Gregory Huson
*Assistant Examiner* — Nicolas A Arnett
(74) *Attorney, Agent, or Firm* — Jianq Chyun IP Office

(57) ABSTRACT

A system for managing liquid supply suitable for a process equipment with a liquid tank is disclosed. The system includes a host, a data-reading tool, a system controller and a tank-locking device. The host stores a built-in liquid database. The data-reading tool used for reading data related to the liquid tank is electrically connected to the host. The host receives the data related to the liquid tank from the data-reading tool, and the received data mapped with the liquid database. The system controller drives the tank-locking device according to the signal from the host to whether or not allow replacement of the liquid tank.

6 Claims, 4 Drawing Sheets

TANK-LOCKING DEVICE, SYSTEM FOR MANAGING LIQUID SUPPLY AND METHOD USING THE SAME

CROSS-REFERENCE TO RELATED APPLICATION

This application is a divisional of and claims the priority benefit of U.S. application Ser. No. 12/022,983, filed on Jan. 30, 2008, now in condition of allowance, which claims the priority benefit of Taiwan application serial no. 96123208, filed on Jun. 27, 2007. The entirety of each of the above-mentioned patent applications is hereby incorporated by reference herein and made a part of this specification.

BACKGROUND OF THE INVENTION

1. Field of the Invention

The present invention generally relates to a system for managing process equipments and a method using the same, and more particularly, to a system for managing liquid supply and a method using the same.

2. Description of Related Art

In a semiconductor process, various liquids are often used for carrying out the process. Taking a lithography process as an example, in the photoresist coating process, the chip surface is spin-coated with a liquid photoresist where the selected photoresist type depends on different process conditions.

When the photoresist in a process machine is used out, a registering and mapping procedure is usually conducted manually, and then, a worker decides to replace the used out photoresist with a fresh photoresist. In more detail, once a photoresist in a machine is used out, a signal would be sent out from the machine to remind the worker to supplement the fresh photoresist, so as to avoid interruption of a production line. In response thereto, the worker would go to remove a fresh photoresist tank of the same type to replace the exhausted photoresist tank. Further, the worker would manually delete the data related to the exhausted photoresist tank in a computer terminal, enter the data related to the fresh photoresist tank and conduct mapping and verification. Finally, the worker would find the exhausted photoresist tank in the photoresist-placing cabinet of the machine and replace the exhausted photoresist tank with a fresh photoresist tank and then restart the machine.

During the above-mentioned process, the data related to the fresh photoresist tank would be mapped against the established database in the computer so as to judge whether the removed fresh photoresist tank is the correct one, which of course is without a mandatory mechanism of control and administration. Since the photoresists are of a variety of types, and some of the photoresists have similar and very close nomenclatures, so that it is very likely to cause a wrong withdrawal due to human negligence. Once a worker does not perform the mapping procedure or ignores the mapping error message to replace a photoresist tank with a correct one, then, a fatal mistake of replacement would occur, which further affects the yield and cost of the entire product.

SUMMARY OF THE INVENTION

Accordingly, the present invention is directed to a system for managing liquid supply for managing the replacement depleted liquid tank with a correct fresh liquid tank.

The present invention is also directed to a method for managing the liquid supply, which promotes precise mapping in order to avoid a replacement with a incorrect liquid tank.

The present invention is also directed to a tank-locking device for locking a liquid tank having an eye ring to help forbidding a worker from arbitrarily replacing a liquid tank.

The present invention provides a system for managing liquid supply suitable to be disposed in a process equipment using a liquid tank. The system includes a host, a liquid tank, a system controller and a tank-locking device. The host has a built-in liquid database. The data-reading tool is electrically connected to the host and for reading the data related to the liquid tank. The system controller is electrically connected to the host. The tank-locking device is connected to the system controller and is disposed on the liquid tank, wherein the tank-locking device includes a slideable locking detent. The host receives the data related to the liquid tank from the data-reading tool and conducts a mapping between the data related to the liquid tank and the liquid database. The system controller drives the tank-locking device according to the signal from the host. When the tank-locking device is in a locking state, the locking detent would fasten the eye ring of the liquid tank; and when the tank-locking device is in release state, the locking detent would release the eye ring of the liquid tank.

In an embodiment of the present invention, the above-mentioned locking detent includes a cavity portion.

In an embodiment of the present invention, when the tank-locking device is in a locking state, the cavity portion would lock the eye ring of the liquid tank.

In an embodiment of the present invention, a liquid level sensor electrically connected to the host is further included for sensing the liquid level in the liquid tank.

In an embodiment of the present invention, the data-reading tool is, for example, a barcode scanner.

In an embodiment of the present invention, the system controller includes a liquid supplier.

In an embodiment of the present invention, the liquid supplier is, for example, an air pressure supplier.

In an embodiment of the present invention, the air pressure supplier has a driving pressure ranging between 1 kg/cm$^2$ and 7 kg/cm$^2$.

In an embodiment of the present invention, the locking detent has a maximum outcome pressure of 6.78 kg/cm$^2$.

In an embodiment of the present invention, the locking detent has a moving speed ranging between 50 mm/sec and 500 mm/sec.

In an embodiment of the present invention, the process equipment is, for example, a photoresist coating and developing machine.

In an embodiment of the present invention, the liquid tank is, for example, a photoresist tank.

The present invention also provides a method for managing the liquid supply suitable for a process equipment using a liquid tank, wherein a tank-locking device in a locking state is disposed on the liquid tank. First, when a liquid tank needs to be replaced, a fresh liquid tank is taken out for reading the data about the fresh liquid tank. Next, a mapping procedure between the data related to the fresh liquid tank and the data related to the liquid tank to be replaced is conducted to ensure they are in accordance with each other. When the data related to the fresh liquid tank and the data about the liquid tank are in accordance with each other, the tank-locking device is driven and switched to release state. Then, the liquid tank is replaced with a correct fresh liquid tank.

In an embodiment of the present invention, the data related to the liquid tank is read by using, for example, a barcode scanner to read the barcode on the fresh liquid tank.

In an embodiment of the present invention, when the data related to the fresh liquid tank is not in accordance with the data related to the liquid tank, the tank-locking device is kept in the locking state.

In an embodiment of the present invention, the process equipment is, for example, a photoresist coating and developing machine.

In an embodiment of the present invention, the liquid tank is, for example, a photoresist tank.

In an embodiment of the present invention, the fresh liquid tank is, for example, a fresh photoresist tank.

The present invention also provides a tank-locking device suitable for a liquid tank having an eye ring. The device includes a body, a fastening portion, a vessel body, a piston, a driving rod and a locking detent. The fastening portion is connected to a side of the body for fastening the device itself onto the liquid tank. The vessel body is embedded in the body, while the liquid inlet of the vessel body is protruded from the body. The piston is disposed in the vessel body. The driving rod is slideably disposed in the vessel body, and an end of the driving rod is connected to the piston. The locking detent is connected to another end of the driving rod and has a cavity portion. When the piston is pushed by a liquid pressure from the liquid inlet, the piston would drive the driving rod to make the locking detent move from a release position to a locking position along a moving axis so as to make the cavity portion lock the eye ring.

In an embodiment of the present invention, the tank-locking device includes an elastic component disposed between the piston and the inner walls of the vessel body for exerting an elastic force to the piston against the bottom of the vessel body so as to drive the driving rod to make the locking detent move from a release position to a locking position.

In an embodiment of the present invention, the above-mentioned elastic component is, for example, a spring coil pulled on the driving rod.

In an embodiment of the present invention, the tank-locking device further includes two guiding rails respectively disposed at both sides of the driving rod, so that the locking detent is able to be leaned on the guiding rails and assure the locking detent to substantially slide along the moving axis.

In an embodiment of the present invention, the body includes an accommodating groove.

In an embodiment of the present invention, the locking detent is slideably disposed in the accommodating groove.

In an embodiment of the present invention, the tank-locking device further includes a liquid-supply device connected to the liquid inlet.

In an embodiment of the present invention, the liquid-supply device is, for example, an air pressure supplier.

According to the above description, the system for managing the liquid, supply according to the present invention, is able to avoid the liquid tank from being arbitrarily replaced since a liquid-supply device is adopted to lock the liquid tank in use. Further, the system controller would control the tank-locking device for controlling the switching state according to the result after the host conducts a data-mapping. Thus, the system for managing the liquid supply is able to effectively conduct mapping and managing the liquid supply and avoid a worker from replacing with an incorrect liquid tank by mistake.

According to an embodiment of the present invention, the tank-locking device is in a locking state during use. Only when the data related to the fresh liquid tank is in accordance with the data related to the previously-used liquid tank, the tank-locking device is allowed to be switched to unlocking state for replacing with a fresh liquid tank. In this way, the method for managing the liquid supply according to the present invention can promote the timely replacement of the liquid tank with a correct liquid tank.

Furthermore, since the liquid-supply device of the present invention employs a slideable locking detent, which can move from a release position to a locking position and lock the eye ring of the liquid tank by driving the liquid-supply system. Thus, replacement of the liquid tank with an incorrect liquid tank by mistake may be effectively avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
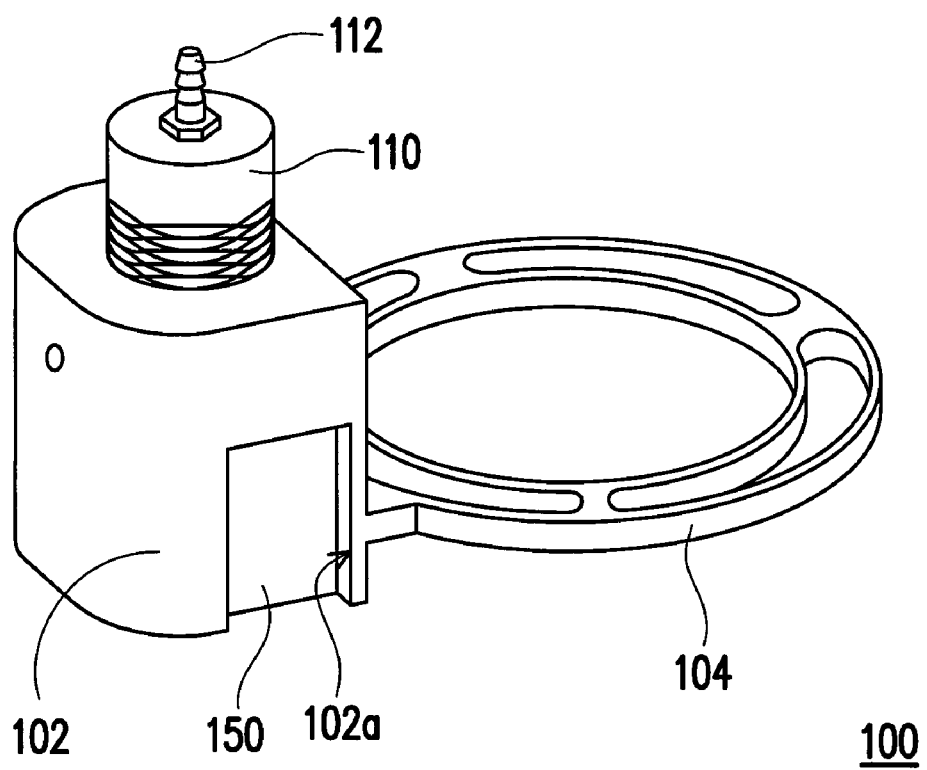
FIG. 1 is a 3D-diagram of a liquid-supply device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
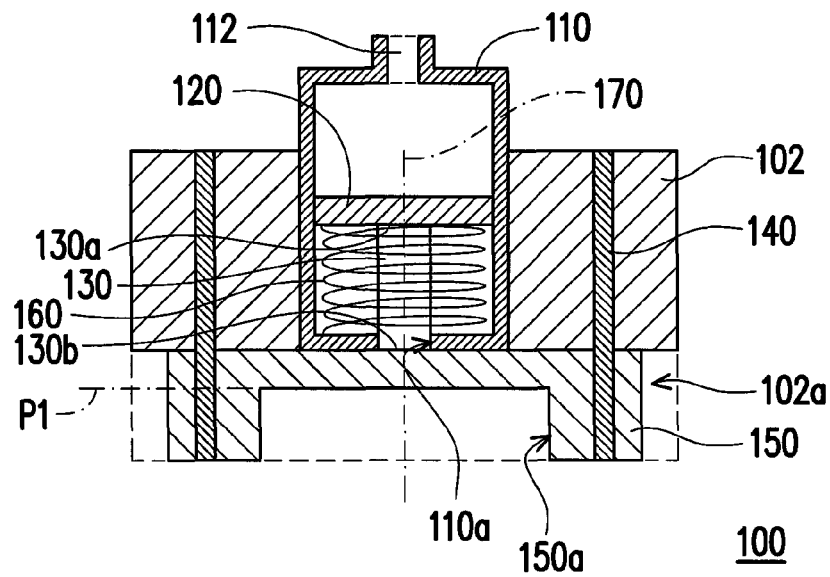
FIGS. 2A and 2B are sectional diagrams of the liquid-supply device in FIG. 1.
Figure 2B:
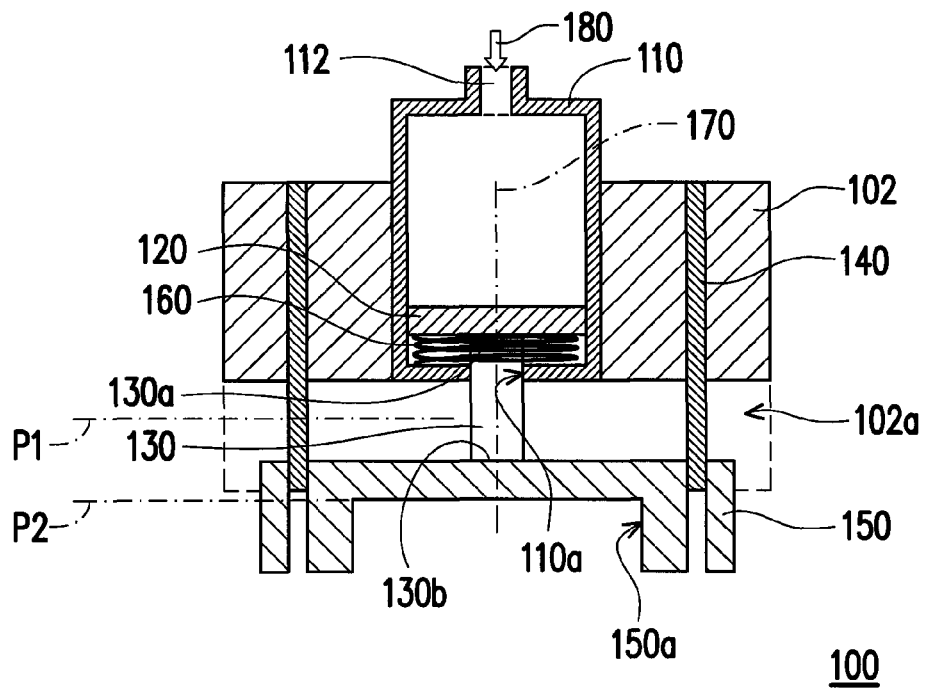

FIG. 1 is a 3D-diagram of a liquid-supply device according to an embodiment of the present invention, and FIGS. 2A and 2B are sectional diagrams of the liquid-supply device in FIG. 1 showing the actions thereof.

Referring to FIGS. 1 and 2A, a liquid-supply device 100 is suitable for a liquid tank having an eye ring (not shown). The liquid-supply device 100 includes a body 102, a fastening portion 104, a vessel body 110, a piston 120, a driving rod 130, guiding rails 140 and a locking detent 150. The body 102 is, for example, a hollow case and an accommodating groove 102a is disposed in the body 102. The fastening portion 104 is connected to a side of the body. The vessel body 110 is embedded, for example, in the body 102. The piston 120 is disposed, for example, in the vessel body 110. The driving rod 130 is slideably disposed in the vessel body 110 and connected to the piston 120. The locking detent 150 is slideably disposed, for example, in the accommodating groove 102a and connected to the driving rod 130. In addition, the guiding rails 140 are respectively disposed, for example, at both sides of the driving rod 130 so as to make the locking detent 150 lean on the guiding rails 140.

As shown by FIG. 1, the fastening portion 104 includes, for example, a hollow ring structure. The connection between the fastening portion 104 and the body 102 is, for example, a fixed connection, so that the ring-shaped fastening portion 104 is able to surround the portion proximate to tank opening of the liquid tank to fasten the liquid-supply device 100 onto the liquid tank. In other embodiments however, the fastening portion 104 can have a structure in any other appropriate geometric form, while the connection between the fastening portion 104 and the body 102 can be a slideable connection as well as long as fastening portion 104 enables the liquid-supply device 100 to be stably leaned on the liquid tank, which the present invention does not limit to.

The vessel body 110 is, for example, a cylinder with cylindrical shape and a chamber for the piston 120 to be accommodated therein and reciprocate along an axis 170. The bottom of the vessel body 110 includes, for example, an opening 110a passing though the bottom. The opening 110a serves as a connection hole for connecting the piston 120 and other components, for example, the locking detent 150.

In addition, for example, a liquid inlet 112 is disposed over the vessel body 110, and the liquid inlet 112 can communicate with the chamber in the vessel body 110. The liquid inlet 112 is, for example, protruded from the body 102. In an embodiment, when the liquid inlet 112 is connected to the liquid-supply device (not shown), the liquid provided by the liquid-supply device would flow from the liquid inlet 112 to the vessel body 110. The piston 120 can move in the vessel body 110 by exerting a liquid pressure onto the piston 120.

The driving rod 130 aligns, for example, the moving axis 170 and is disposed between the piston 120 and the locking detent 150. The driving rod 130 includes an end 130a and another end 130b which are respectively connected to the piston 120 and the locking detent 150. In the present embodiment, the end 130a of the driving rod 130 is connected to the lower portion of the piston 120, while the end 130b of the driving rod 130 passes through the opening 110a at the bottom of the vessel body 110 to connect the upper portion of the locking detent 150.

The locking detent 150 has a cavity portion 150a which takes, for example, the moving axis 170 as the center axis thereof and is disposed at the bottom of the locking detent 150. The shape of the cavity portion 150a, for example, corresponds to the eye ring of the liquid tank. The upper portion of the eye ring of the liquid tank can be enclosed by the cavity portion 150a so that the locking detent 150 just snaps the convex eye ring of the liquid tank.

In addition, the guiding rails 140 are, for example, symmetrically disposed at both sides of the moving axis 170, wherein the guiding rails 140 respectively go through the locking detent 150 and are located at both sides of the cavity portion 150a so as to enable the locking detent 150 to slide along the guiding rails 140. In this way, the locking detent 150 is assured by the guiding rails 140 to slide back and fourth substantially along the moving axis 170.

In order to enable the locking detent 150 to reciprocate along the guiding rails 140, the tank-locking device 100 of the present invention can employ an elastic component 160 disposed, for example, between the piston 120 and the inner walls of the vessel body 110. By means of the restoring force of the elastic component 160 exerted onto the piston 120, the driving rod 130 is able to bring the locking detent 150, along the guiding rails 140, to move upwards relative to the vessel body 110. In the present embodiment, the elastic component 160 includes, for example, a spring coil pulled on the driving rod 130.

FIGS. 2A and 2B show sectional diagrams of the liquid-supply device 100. As shown by FIG. 2A, when no liquid pressure from the liquid inlet 112 is exerted onto the piston 120, the tank-locking device 100 would be maintained in the unlocking state; meanwhile, the piston 120 would not drive the driving rod to push the locking detent 150 and the locking detent 150 is maintained in the unlocking state.

Referring to FIG. 2B, when the liquid-supply device (not shown) outputs liquid to the vessel body 110 via the liquid inlet 112, the piston 120 would be exerted by a liquid pressure 180 from the liquid inlet 112 and moves towards the elastic component 160 under the liquid pressure 180, which compresses the elastic component 160 so that the piston 120 would move towards the bottom of the vessel body 110. At this time, the driving rod 130 also moves along with the piston 120 and drives the locking detent 150 to move from a release position P1 to a locking position P2 along the guiding rails 140 and the moving axis 170, which further enables the cavity portion 150a to lock the eye ring of the liquid tank, and meantime, the tank-locking device 100 is in a locking state.

Next, as shown in FIG. 2A, when the liquid-supply device stops to output liquid, the piston 120 would be free from the liquid pressure 180 from the liquid inlet 112 and the elastic component 160 exerts an elastic force towards the bottom of the vessel body 110 onto the lower portion of the piston 120. Under the restoring action of the elastic component 160 onto the piton 120, the driving rod 130 would be pulled by the piton 120 to drive the locking detent 150 for moving to the release position P1 along the guiding rails 140.

In other words, the piston 120 in the tank-locking device 100 reciprocates under the liquid pressure 180 exerted thereto and the restoring action of the elastic component 160. The piton 120 would pull the driving rod 130 to drive the locking detent 150 for moving so as to switch the tank-locking device 100 to different state.

Figure 3:
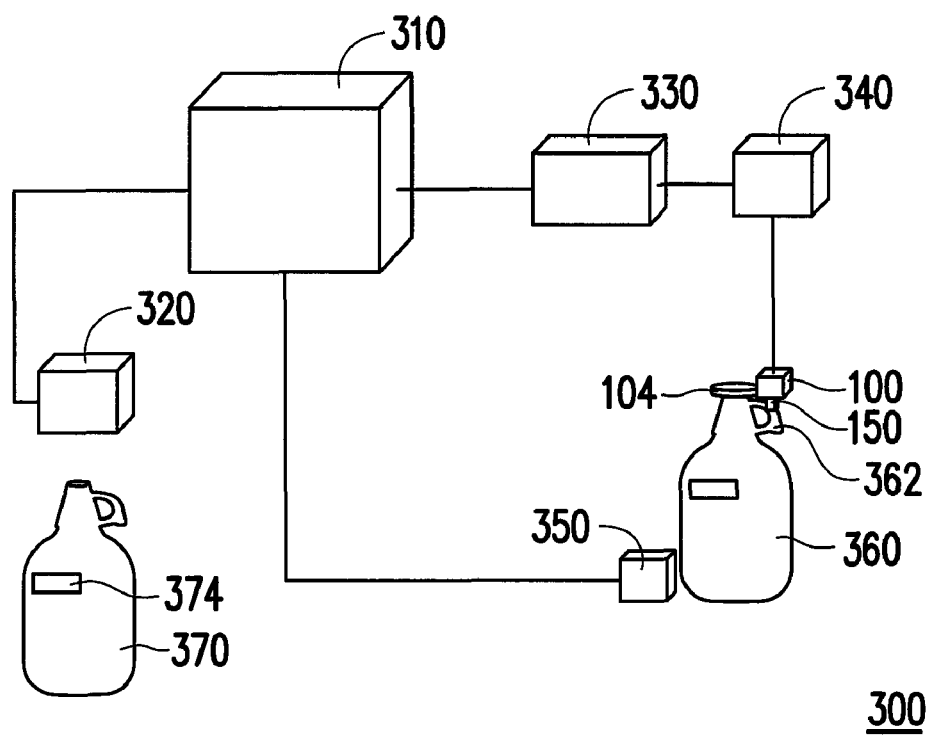
FIG. 3 is a diagram showing a configuration of a system for managing liquid supply according to an embodiment of the present invention.

In the following, the application of the tank-locking device 100 in a system for managing the liquid supply is depicted. FIG. 3 is a diagram showing the configuration of a system for managing the liquid supply according to an embodiment of the present invention. In FIGS. 3, 1, 2A and 2B, all the same components are marked by the same notations and they are omitted to describe.

Referring to FIG. 3, a system 300 for managing the liquid supply is suitable to be disposed in a process equipment using a liquid tank 360. In the embodiment, the system 300 for managing the liquid supply of the present invention is used in, for example, a photoresist coating and developing machine. The liquid tank 360 is, for example, a photoresist tank and a fresh liquid tank 370 is, for example but not limited to, a fresh photoresist tank for replacing the liquid tank 360. Certainly, except for the semiconductor process, the system 300 for managing the liquid supply may be used in other appropriate fields as well, which the present invention does not limit to.

The system 300 for managing the liquid supply includes a host 310, a data-reading tool 320, a system controller 330, a tank-locking device 100 and a liquid level sensor 350. The data-reading tool 320 is electrically connected to the host 310, the system controller 330 is electrically connected to the host 310, the tank-locking device 100 is electrically connected to the system controller 330 and the liquid level sensor 350 is electrically connected to the host 310.

The host 310 is, for example, disposed in the photoresist coating and developing machine for receiving the signals sent from the liquid level sensor 350 and the data-reading tool 320, and then, the host 310 further sends a signal to control the system controller 330 for operation. The host 310 includes, for example, a built-in liquid database for mapping the data related to the liquid tank 360 and the data related to the fresh liquid tank 370.

The data-reading tool 320 is employed for reading the data on the fresh liquid tank 370. In the present embodiment, the data-reading tool 320 includes a barcode scanner capable of conducting data-transferring in wireless mode, which is, for example, a personal digital assistant (PDA), wherein the data-reading tool 320 is used to scan the label on the fresh liquid tank 370 and obtain the data related to the fresh liquid tank 370 through the barcode on the label 374. Next, the data-reading tool 320 sends the data related to the fresh liquid tank 370 to the host 310 so as to further map the received data with the liquid database in the host 310 to verify whether the data related to the fresh liquid tank 370 is in accordance with the data about the liquid tank 360.

The system controller 330 receives the signal sent from the host 310 to drive the tank-locking device 100. The system controller 330 further includes a liquid-supply device 340. The liquid-supply device 340 is connected between the system controller 330 and the tank-locking device 100. In the present embodiment, the liquid-supply device 340 is, for example, an air pressure supplier which provides a driving pressure ranging between 1 kg/cm$^2$ and 7 kg/cm$^2$. The system controller 330 can control the operation of the liquid-supply device 340 according to the signal from the host 310 so as to further switch the tank-locking device 100 to different states. When the liquid-supply device 340 is turned on, a liquid pressure would be applied to the tank-locking device 100; when the liquid-supply device 340 is turned off, no liquid pressure would be applied to the tank-locking device 100.

The tank-locking device 100 is disposed on the liquid tank 360 having an eye ring. The tank-locking device 100 includes a fastening portion 104 and a slideable locking detent 150. The fastening portion 104, for example, surrounds a portion proximate to the tank opening of the liquid tank 360 to fasten the tank-locking device 100 onto the liquid tank 360. The tank-locking device 100 drives the locking detent 150 for moving by means of the liquid-supply device 340, so that the tank-locking device 100 is switched to different states for locking and unlocking the liquid tank 360.

When the liquid-supply device 340 applies a liquid pressure to push the locking detent 150, the cavity portion (not shown) of the locking detent 150 would lock the eye ring 362 of the liquid tank 360 and at this time the tank-locking device 100 is in a locking state; when the liquid-supply device 340 stops to apply the liquid pressure by pushing the locking detent 150, the locking detent 150 would release the eye ring 362 of the liquid tank 360 and at this time, the tank-locking device 100 is in an unlocking state. In the present embodiment, the maximum outcome pressure of the locking detent 150 is 6.78 kg/cm$^2$ and the moving speed of the locking detent 150 ranges between 50 mm/sec and 500 mm/sec.

It should be noted that during the operation of the photoresist coating and developing machine, the tank-locking device 100 is, for example, in a locking state. Thus, the locking detent 150 can lock the eye ring 362 of the liquid tank 360, so that a worker is unable to easily replace the liquid tank 360.

The liquid level sensor 350 is employed for sensing the liquid usage situation in the liquid tank 360 and sends the sensed liquid level to the host 310, so that the host 310 can decide whether or not to send out an alert signal to inform the worker to replace the liquid tank 360. The liquid level sensor 350 is, for example, an optical sensor or other appropriate sensors, wherein a sensing level is preset and the preset sensing level is different depending on a practical situation. The liquid level sensor 350 is, for example, disposed on the side wall of the liquid tank 360 and a transparent window (not shown) disposed on the side wall of the liquid tank 360 is used to sense the liquid level. The liquid level sensor 350 may be directly disposed in the liquid tank 360 for sensing the liquid level in the liquid tank 360. Except for the above-mentioned techniques, other appropriate techniques can be used to dispose the liquid level sensor 350.

In the above-mentioned embodiment, the system 300 for managing the liquid supply exemplarily takes a set of tank-locking devices 100, but the present invention does not specifically limit the quantity of the tank-locking device 100, and anyone skilled in the art can adjust the quantity according to the actual requirement.

The system 300 for managing the liquid supply, according to the present invention, uses the data-reading tool 320 to scan the barcode on the label of the fresh liquid tank 370 and obtain the data related to the fresh liquid tank 370. Next, the data-reading tool 320 sends the data related to the fresh liquid tank 370 to the host 310 in wireless mode. The host 310 maps the received data about the fresh liquid tank 370 with the built-in liquid database to verify whether or not the data related to the fresh liquid tank 370 is in accordance with the data about the liquid tank 360. If the result of the mapping is correct, the host 310 would send a signal to the system controller 330 to turn off the liquid-supply device 340 so as to switch the tank-locking device 100 to unlocking state and release the eye ring 362 of the liquid tank 360. Next, the liquid tank 360 is removed and replaced by a fresh liquid tank 370.

Figure 4:
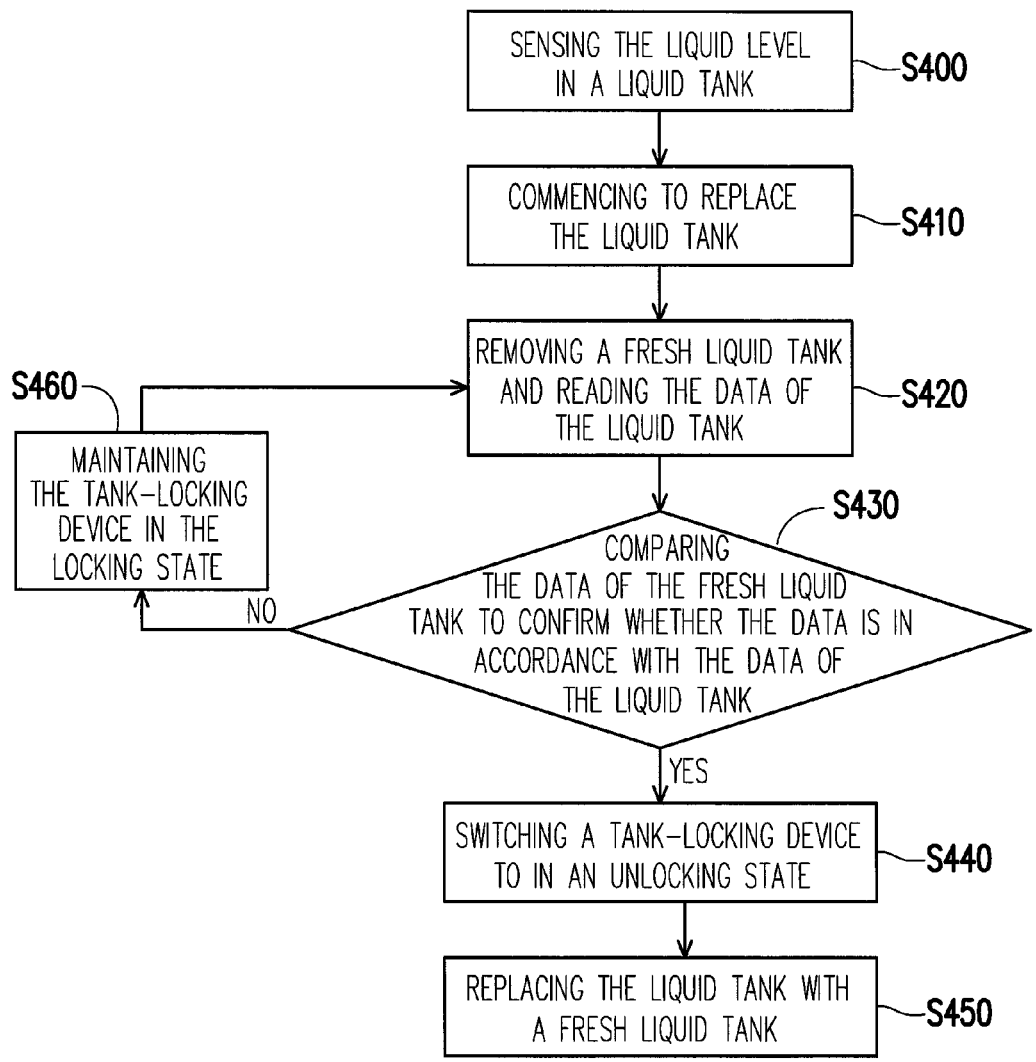
FIG. 4 is a flowchart of a method for managing liquid according to an embodiment of the present invention.

In the following, a method for managing a liquid is conducted by the system 300 for managing the liquid supply is depicted. FIG. 4 is a flowchart illustrating the method for managing the liquid according to an embodiment of the present invention.

The liquid-managing method of the present invention is suitable for a process equipment wherein the tank-locking device 100 is disposed on the employed liquid tank 360 and the tank-locking device 100 is maintained in the locking state as the default state thereof, so that replacement of the liquid tank 360 with an incorrect liquid tank by mistake may be avoided.

Referring to FIGS. 3 and 4, first, the liquid level in the liquid tank 360 is sensed (step S400). In step S400, the liquid level in the liquid tank 360 is sensed by the liquid level sensor 350 and the signal of the liquid level is sent back to the host 310.

Next, in step S410, if the liquid level sensor 350 reveals the liquid level in the liquid tank 360 reaches or is lower than the preset sensing level, it means the liquid in the liquid tank 360 is going to be depleted soon. At this time, the host 310 electrically connected to the liquid level sensor 350 sends a signal, which is, for example, displayed on the screen of the host 310 or an alarm sound or alarm light to inform the worker to replace the liquid tank 360.

Next, in step S420, a fresh liquid tank 370 is removed, and the data related to the fresh liquid tank 370 is read. In the present embodiment, a data-reading tool 320 is used to scan the barcode of the label 374 on the fresh liquid tank 370 to acquire the data related to the fresh liquid tank 370 and thereafter the data-reading tool 320 sends back the data related to the fresh liquid tank 370 to the host 310 in, for example, wireless mode.

Next, in step S430, the host 310 conducts mapping on the data related to the fresh liquid tank 370 with the data related to the liquid tank 360 to judge whether the data of the two liquid tanks are in accordance with each other. The mapping is performed by using, for example, a software to map the data about the fresh liquid tank 370 with the liquid database established in the host 310 to double check the correctness of the fresh liquid tank 370 taken by the worker.

Furthermore, in step S440, when the data related to the fresh liquid tank 370 is in accordance with the data related the liquid tank 360, the host 310 sends a signal to the system controller 330. The signal is, for example, a signal for turning on the tank-locking device 100. The system controller 330 turns off the liquid-supply device 340 according to the signal sent by the host 310. Once the liquid-supply device 340 stops exerting liquid pressure, the tank-locking device 100 would be thereby driven and switched to unlocking state so as to make the locking detent 150 release the eye ring 362 of the liquid tank 360.

Moreover, in step S450, after the tank-locking device 100 is turned on, the liquid tank 360 can be taken out by the worker, and then replaced with a fresh liquid tank 370 to achieve the goal of correctly replacing the liquid tank 360.

After step 430, when the data related to the fresh liquid tank 370 does not conform in accordance with the data about the liquid tank 360, the host 310 would also send a signal to the system controller 330, wherein the sent signal is, for example, a signal to lock the tank-locking device 100. The system controller 330 makes the liquid-supply device 340 to continuously exert the liquid pressure to the tank-locking device 100, and the tank-locking device 100 then would maintain in the locking state (step S460), so that the liquid tank 360 can not be taken out which mandatorily forbids a worker from replacing a tank. Thereafter, the procedure returns back to step S420 again in order to remove a correct fresh liquid tank and continue the successive steps. That is, the procedure is repeated until a correct fresh liquid tank is removed and the data thereof is read and mapped to ensure the fresh liquid tank is the correct one for replacement. The following steps and the detail thereof can be easily deduced by those skilled in the art, and they are omitted to describe herein.

In summary, when the liquid supply is not sufficient or replacement of the liquid tank is necessary, the system for managing the liquid supply and method using the same would use a data-reading tool to scan the barcode of a fresh liquid tank, the data related to the liquid tank is sent to the host and a mapping and verification procedure are conducted by the host such that a wrong judgment due a worker's misjudgment may be avoided. In addition, the tank-locking device is driven by the system controller according to the result after the host conducts a mapping, which thereby avoids a worker to replace a liquid tank when the level of the liquid with the liquid tank has not reached the preset level. Thus, the present invention is able to prevent any replacement of the liquid tank by mistake due to human negligence, and therefore the loss liquid may be effectively avoided.

On the other hand, the system for managing liquid supply and the method using the same include reading the data related to the fresh liquid tank by means of the simple system and the process steps, then conducting a mapping between the data related to the fresh liquid tank and the data related to the liquid tank in use to verify whether they are in accordance with each other, which allows double checking and correctness.

Moreover, the tank-locking device of the present invention controls the movement of the locking detent by using liquid pressure mode, not by using electrical control mode. Therefore, any electronic component from coming in contact with the flammable liquid may be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing a liquid supply, suitable for a process equipment using a liquid tank comprising a tank-locking device in a locking state, comprising:
   removing a fresh liquid tank and reading a data related to the fresh liquid tank when the liquid tank is required to be replaced;
   mapping the data related to the fresh liquid tank with a data related to the liquid tank to verify whether the two data are in accordance with each other;
   driving a slideable locking detent to switch the tank-locking device to an unlocking state when the data related to the fresh liquid tank is in accordance with the data related to the liquid tank; and
   replacing the liquid tank with the fresh liquid tank.

2. The method according to claim 1, wherein the step of reading the data related to the fresh liquid tank comprises reading a barcode on the fresh liquid tank by using a barcode scanner.

3. The method according to claim 1, wherein when the data related to the fresh liquid tank is not in accordance with the data related to the liquid tank the tank-locking device, the tank-locking device is in the locking state.

4. The method according to claim 1, wherein the process equipment comprises a photoresist coating and developing machine.

5. The method according to claim 4, wherein the liquid tank comprises a photoresist tank.

6. The method according to claim 5, wherein the fresh liquid tank comprises a fresh photoresist tank.

* * * * *